(12) United States Patent
Hollebeek (10) Patent No.: US 10,498,722 B2
(45) Date of Patent: Dec. 3, 2019

(54) METHODS AND APPARATUS TO ISSUE DIGITAL CERTIFICATES

(71) Applicant: Trustwave Holdings Inc, Chicago, IL (US)

(72) Inventor: Timothy John Hollebeek, Pittsburgh, PA (US)

(73) Assignee: Trustwave Holdings Inc., Chicago, IL (US)

( * ) Notice: Subject to any disclaimer, the term of this patent is extended or adjusted under 35 U.S.C. 154(b) by 213 days.

(21) Appl. No.: 15/444,284

(22) Filed: Feb. 27, 2017

(65) Prior Publication Data

US 2018/0248858 A1 Aug. 30, 2018

(51) Int. Cl.
| | | |
|---|---|---|
| *H04L 29/06* | (2006.01) |
| *G06F 21/33* | (2013.01) |
| *G06F 21/40* | (2013.01) |
| *H04L 9/32* | (2006.01) |
| *H04L 9/06* | (2006.01) |
| *H04L 9/08* | (2006.01) |
| *H04L 9/30* | (2006.01) |

(52) U.S. Cl.
CPC ........ *H04L 63/0823* (2013.01); *H04L 9/0662* (2013.01); *H04L 9/0869* (2013.01); *H04L 9/321* (2013.01); *H04L 9/3236* (2013.01); *H04L 9/3263* (2013.01); *H04L 9/3268* (2013.01)

(58) Field of Classification Search
CPC ... H04L 63/0823; H04L 63/20; H04L 9/3247; H04L 63/08; H04L 63/102; H04L 9/3263; H04L 2209/38; H04L 63/0876; H04L 9/3268; H04L 63/06; H04L 9/083; H04L 9/085; H04L 9/321; H04L 63/062; H04L 9/3236; H04L 9/3242; H04L 9/3273; H04L 9/3297; H04L 9/0869; H04L 9/0662

See application file for complete search history.

(56) References Cited

U.S. PATENT DOCUMENTS 9,525,557 B2    12/2016  Tanaka et al.
2001/0049787 A1*  12/2001  Morikawa ............. H04L 9/3213
                                                           713/156

(Continued)

OTHER PUBLICATIONS

Cryptography, "Generating a number using SHA512 that users can later verify (once I publish secret seed)," http://crypto.stackexchange.com/questions/15340/generating-a-number-using-sha512-that-users-can-later-verify-once-i-publish-sec, Apr. 2014, 4 pages.

(Continued)

*Primary Examiner* — Michael Simitoski
(74) *Attorney, Agent, or Firm* — Banner & Witcoff, Ltd.

(57) ABSTRACT

Methods, apparatus, systems and articles of manufacture to issue digital certificates are disclosed. An example apparatus includes a certificate issuer to communicate, from a first entity, a digital certificate to be signed with a request for identifiers, and a value receiver to receive, at the first entity, a first value uniquely identifying a second value from a second entity and, after a period for accepting identifiers has ended, receiving, at the first entity, the second value from the second entity, the certificate issuer to combine, at the first entity, the second value and a third value to generate a certificate identifier for the digital certificate and to issue the digital certificate with the certificate identifier.

15 Claims, 4 Drawing Sheets

(56) References Cited

U.S. PATENT DOCUMENTS

| | | | |
|---|---|---|---|
| 2005/0091485 A1* | 4/2005 | Imai | H04L 63/0823 |
| | | | 713/156 |
| 2011/0258685 A1* | 10/2011 | Qiu | G06F 21/572 |
| | | | 726/5 |
| 2014/0075185 A1* | 3/2014 | Dragomir | H04L 9/3268 |
| | | | 713/156 |
| 2014/0149740 A1* | 5/2014 | Sato | H04L 9/006 |
| | | | 713/158 |
| 2015/0237031 A1 | 8/2015 | Neuman et al. | |
| 2015/0341178 A1* | 11/2015 | Tanaka | H04L 9/0822 |
| | | | 713/156 |
| 2016/0292676 A1 | 10/2016 | French et al. | |
| 2017/0187540 A1* | 6/2017 | Stopel | H04L 9/3268 |

OTHER PUBLICATIONS

Cryptography, "Trustless, Multi party Random Number Generation," Jan. 8, 2014, http://crypto.stackexchange.com/questions/12775/trustless-multiparty-random-number-generation, 2 pages.

\* cited by examiner

METHODS AND APPARATUS TO ISSUE DIGITAL CERTIFICATES

FIELD OF THE DISCLOSURE

This disclosure relates generally to digital certificates, and, more particularly, to methods and apparatus to issue digital certificates.

BACKGROUND

A digital certificate is a data structure that includes information that may be used for securing network communications. Typically, a digital certificate is issued to a requesting entity by a trusted entity that third parties know and trust. Because the trusted entity vouches integrity of the certificate and or the identity of the requesting entity, the digital certificate may be used in security applications. For example, the digital certificate may be used to confirm the identity of the sender or recipient of a network communication, may be used to encrypt a network communication, may be used to prove that a communication has not been tampered with, etc.

BRIEF DESCRIPTION OF THE DRAWINGS

Wherever possible, the same reference numbers will be used throughout the drawing(s) and accompanying written description to refer to the same or like parts.

DETAILED DESCRIPTION

When issuing digital certificates, inclusion of a random serial number guards against the possibility that the certificate has been generated as part of a pair of certificates with the same hash. For example, if a pair of certificates having the same hash are created, and one is signed without modification, it is possible to transfer the signature from an innocent-looking certificate to the other un-validated certificate which contains whatever information the requester wants. For this reason, some requirements require the use of a cryptographically secure pseudo random number generator to generate certificate serial numbers. However, even when a certificate issuer claims that they have issued the certificate using such a random number generator, it is generally not possible for a third party to verify that a particular serial number is actually random, as opposed to having been carefully chosen in order to generate a hash collision. In both cases, the serial number appears to be an arbitrary string of digits.

Methods and apparatus disclosed herein issue certificates that include a serial number that is generated using process that is both secure and verifiable by third parties (e.g., web browser developers, the public, etc.). As disclosed in detail herein, a serial number for a certificate is generated based on a combination of value from the certificate issuer and values received from one or more third parties. To ensure that neither the certificate issuer nor the third parties can improperly influence the resulting signature, prior to each of the entities revealing their value contribution, the entities reveal a preliminary value (e.g., a hash) for their value contribution during a preliminary time period. Accordingly, after the preliminary time period when each of the entities reveals their value contribution, value contribution can be compared with the preliminary value to ensure that no entity has changed their value contribution after viewing the value contributions of others. Thus, the serial number is generated in a manner that is secure and in which each participating entity can verify that the resulting serial number could not have been predicted or selected by the other entities.

Figure 1:
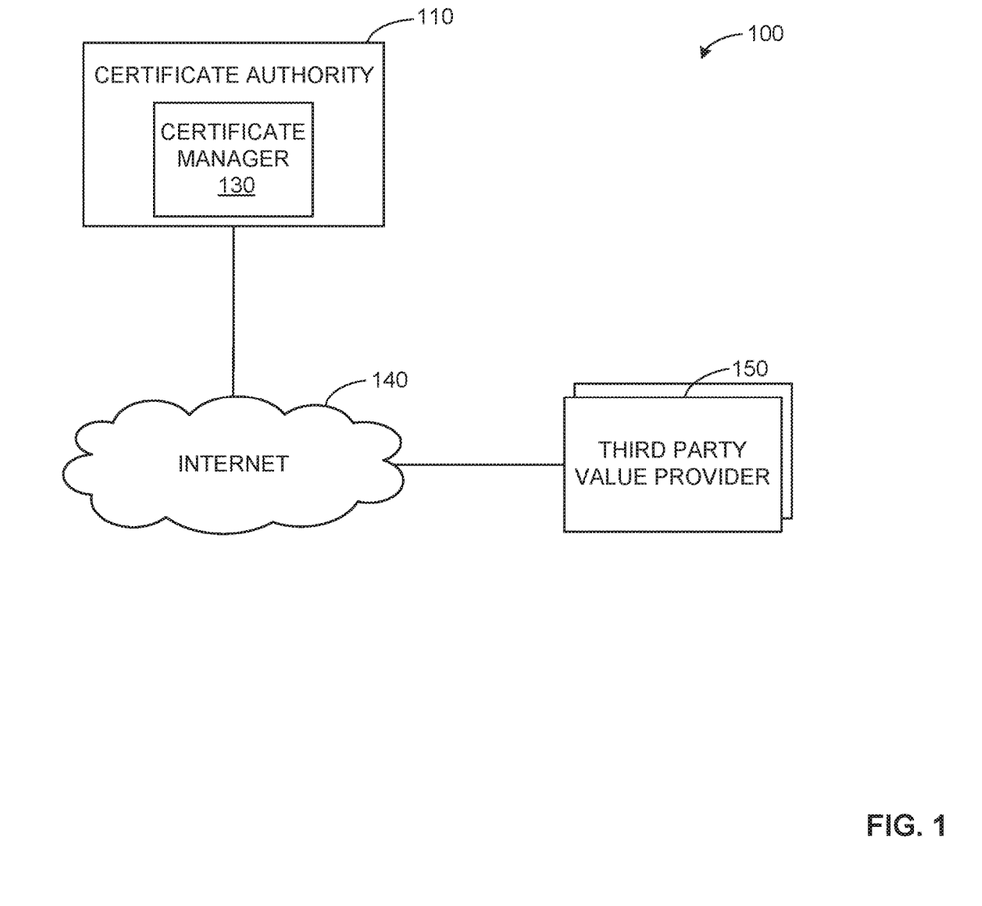
FIG. 1 is a block diagram of an example environment in which a certificate authority issues a digital certificate in accordance with the methods and apparatus disclosed herein.

FIG. 1 is a block diagram of an example environment 100 in which a certificate authority 110 issues a digital certificate in accordance with the methods and apparatus disclosed herein. The example environment 100 includes the example certificate authority 110, which includes an example certificate manager 130, example network 140, and a plurality of example third-party value providers 150.

The certificate authority 110 of the illustrated example is an entity that issues digital certificates. The example certificate authority 110 is trusted by other entities connected to the example network 140 (e.g., the example third-party value providers 150). For example, the certificate authority 110 may participate in a public process for certifying its trustworthiness, may register with a certifying entity, etc. Alternatively, the certificate authority 110 may be any type of entity (e.g., an entity that issues digital certificates for private use, an entity that is trusted by a limited number of other entities, etc.).

The example certificate authority 110 maintains a root certificate(s) with which the example certificate authority 110 signs digital certificates. The example root certificate(s) utilize a public key infrastructure. The secrecy of the private key(s) associated with the root certificate(s) is carefully maintained to ensure the integrity of the digital certificates signed by the roots certificate(s).

The example certificate authority 110 of FIG. 1 includes the example certificate manager 130 to issue digital certificates. The certificate manager 130 of the illustrated example is a computing server (s) that issues certificates that include a certificate identifier (e.g., a serial number). The certificate identifier is intended to uniquely identify a particular digital certificate from the example certificate authority 110. To ensure the integrity of the digital certificates, the unpredicability of the certificate identifier is important. To generate a verifiable certificate identifier, the example certificate manager 130 collects values from the example third-party value providers 150 and utilizes the values in generating the certificate identifier. The certificate generation is described in further detail in conjunction with FIG. 2 and FIG. 3.

The network 140 of the illustrated example is the Internet, which communicatively couples the example certificate authority 110, the example third-party value providers 150, and other computing devices connected to the example network 140. The network 140 may, alternatively, the any other type of network such as one or more wired networks, wireless networks, local area networks, wide area, etc. While the illustrated example includes the example network 140 for sharing information among the certificate authority 110 and the third-party value providers 150, information may additionally or alternatively be shared in any other manner (e.g., via postal communications, etc.).

The plurality of example third-party value providers 150 are entities that want to participate in the issuance of a digital certificate. The example third-party value providers 150 are entities that distribute web browsers that include root certificates issued by the example certificate authority 110. According to the illustrated example, the example third-party value providers 150 contribute values to the example certificate manager 130 for use in generating the certificate identifier for a digital certificate that is to be issued. While the illustrated example includes a plurality of third-party value providers 150, there may be any number of third-party value providers 150 (e.g., 1, 2, 10, 20, etc.).

Figure 2:
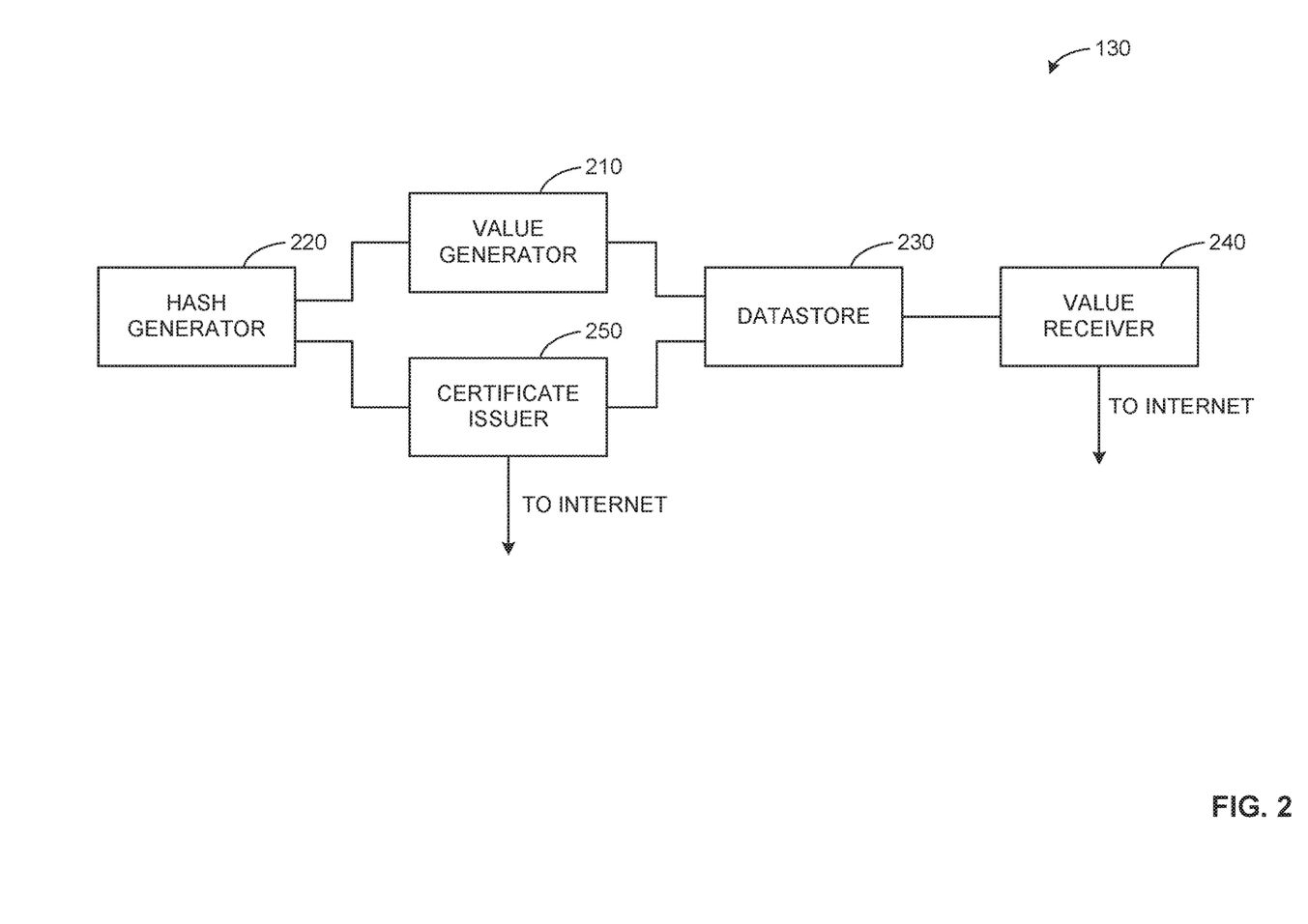
FIG. 2 block diagram of an example implementation of the certificate manager of FIG. 1.

FIG. 2 is a block diagram of an example implementation of the certificate manager 130 of FIG. 1. The example certificate manager 130 of FIG. 2 includes an example value generator 210, an example hash generator 220, an example data store 230, an example value receiver 240, and an example certificate issuer 250.

The example value generator 210 generates values to be used in generating certificate identifiers. According to the illustrated example, the value generator 210 is a random number generator that generates random and/or pseudo random number. Alternatively, the value generator 210 may generate the values in any other manner. The example value generator 210 stores the generated value(s) in the example datastore 230.

The example hash generator 220 generates values representative of the values generated by the example value generator 210. The representative value is associated with the generated values such that one cannot determine the generated value from the representative value, but one can determine the representative value from the generated value (e.g., having received the representative value at a first time and the generate value at a second, later, time, one can determine that the generated value has not been changed after the first time because the representative value is substantially uniquely associated with the generated value). The example hash generator 210 generates hash values (e.g., using Secure Hash Algorithm (SHA)-256). Alternatively, any other type of value representative of another value may be utilized (e.g., a cyclic redundancy check (CRC) computed for the generated value, a different version of the SHA, etc.). The example hash generator 220 transmits generated representative values to the example certificate issuer 250 for publication with the digital certificate to be signed. Alternatively, the hash generator 220 may publish the representative values itself (publish on a website, publish on a mailing list, etc.).

The datastore 230 of the illustrated example is a database of values generated by the value receiver 210 and received from third parties via the example value receiver 240. Alternatively, the datastore may be any type of storage such as one or more of a hard drive, a file, a memory, etc.

The value receiver 240 of the illustrated example receives representative values and generated values for use in generating a certificate identifier from third parties (e.g., the example third party value providers 150 of FIG. 1). The example value receiver 240 receives the values via electronic communications transmitted via the example network 140. Alternatively, the representative values and/or the generated values may be received in any other manner. According to the illustrated example, the value receiver 240 stores the representative values and the generated values in the example datastore 230. Alternatively, the value receiver 240 may not receive and/or store the representative values in the example datastore 230.

The certificate issuer 250 of the illustrated example generates digital certificates, publishes an intent to issue the digital certificate, and generates a certificate identifier based on the values generated by the example value generator 210 and received by the example value receiver 240. According to the illustrated example, the certificate issuer 250 generates certificates with a public/private key pair. Alternatively, any other type of certificate may be generated.

The example certificate issuer 250 publishes certificates to be issued on a webpage that requests submissions of values for use in generating the certificate identifier. The example certificate issuer 250 also publishes the representative value(s) (e.g., hash(es)) generated by the example hash generator 220. Alternatively, the certificates to be issued and the representative values may be published, communicated, released, etc. in any other manner (e.g., published to a mailing list, sent by an electronic message to one or more third parties, etc.).

While an example manner of implementing the certificate manager 130 of FIG. 1 is illustrated in FIG. 2, one or more of the elements, processes and/or devices illustrated in FIG. 2 may be combined, divided, re-arranged, omitted, eliminated and/or implemented in any other way. Further, the example value generator 210, the example hash generator 220, datastore 230, the example value receiver 240, the example certificate issuer 250 and/or, more generally, the example certificate manager may be implemented by hardware, software, firmware and/or any combination of hardware, software and/or firmware. Thus, for example, any of the example value generator 210, the example hash generator 220, datastore 230, the example value receiver 240, the example certificate issuer 250 and/or, more generally, the example certificate manager could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example value generator 210, the example hash generator 220, datastore 230, the example value receiver 240, the example certificate issuer 250 and/or, more generally, the example certificate manager is/are hereby expressly defined to include a tangible computer readable storage device or storage disk such as a memory, a digital versatile disk (DVD), a compact disk (CD), a Blu-ray disk, etc. storing the software and/or firmware. Further still, the example certificate manager 130 of FIG. 1 may include one or more elements, processes and/or devices in addition to, or instead of, those illustrated in FIG. 2, and/or may include more than one of any or all of the illustrated elements, processes and devices.

Figure 3:
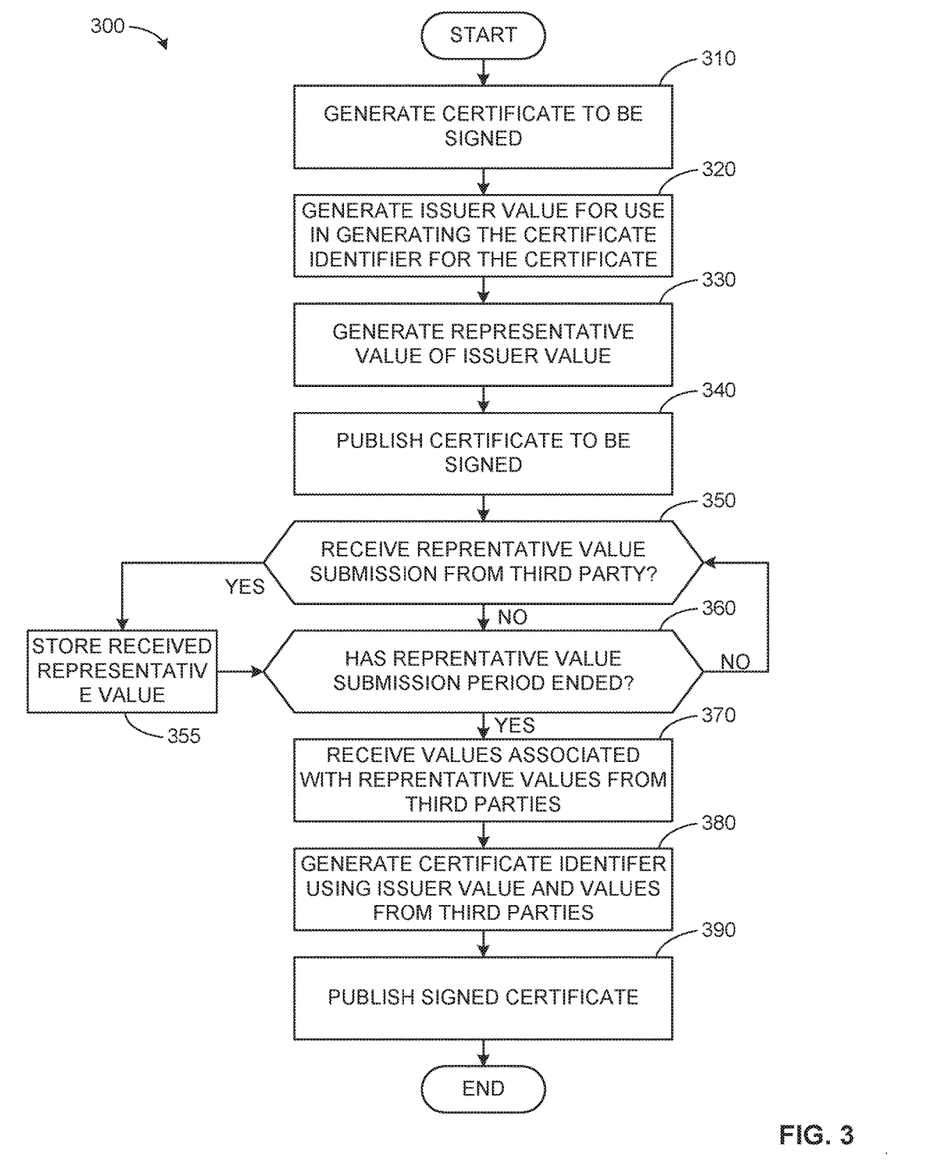
FIG. 3 flowchart illustrative of machine-readable instructions that may be executed to implement the certificate manager of FIG. 1.

A flowchart representative of example machine readable instructions for implementing the certificate manager of FIG. 1 and/or FIG. 2 is shown in FIG. 3. In this example, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example certificate manager 130 may alternatively be used. For example, the order of execution of the blocks may be changed, some of the blocks described may be changed, eliminated, or combined, and/or some blocks may be performed manually and/or by a user.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 300 of FIG. 3 begins at block 310 when the certificate issuer 250 generates a certificate to be signed. For example, an administration and/or user may have requested issuance of a new certificate from the example certificate authority 110. The certificate may be a root digital certificate or any other type of digital certificate.

The example value generator 210 generates an issuer value to be used in generating a certificate identifier for the certificate (block 320). For example, the value generator 210 may store the issuer value in the datastore 230 and transmit the issuer value to the hash generator 220.

The example hash generator 220 generates a representative value (e.g., a hash value) of the issuer value (block 330). The example certificate issuer 250 then publishes the certificate to be issued along with the representative value generated by the hash generator 220 (block 340). For example, the certificate may be published with an identification of a period of time and/or instructions for third parties to submit values to be used in generating the certificate identifier.

The example value receiver 240 determines if a third party has submitted a representative value (block 350). When a third party (e.g., the example third party value providers 150 of FIG. 1) has submitted a representative value, the value receiver 240 stores the representative value in the example datastore 230 (block 355).

After the value receiver 240 determines that no representative values have been received (block 350) or has stored a representative value in the datastore 230 (block 355), the certificate issuer 250 determines if the representative value submission period has ended (block 360). For example, the representative value submission period may end after an amount of time has passed since the publication of the certificate to be issued, after a threshold number of submissions of representative values, etc. When the representative value submission period has not ended, control returns to block 350 to continue waiting for further submissions.

When the representative value submission period has ended (block 360), the example value receiver 240 receives the values associated with the received representative values from the third parties and stores the values in the datastore 230 (block 370). The example certificate issuer 250 retrieves the issuer value(s) and the value(s) from the third parties and generates the certificate identifier for the certificate based on the issuer value(s) and the value(s) (block 380). According to the illustrated example, the certificate issuer 250 generates the certificate identifier from an exclusive OR of the values (e.g., certificate identifier=issuer value XOR value 1 XOR value 2 XOR value 3). Alternatively, any other operation to generate a certificate identifier based on the issuer value(s) and/or the value(s) may be utilized. Additionally, the certificate issuer 250 may perform a validation procedure to confirm that the received value(s) correspond with the previously received representative value(s). For example, if a value X is received, the certificate issuer 250 may determine the received representative value can be computed from the value X (e.g., the SHA-256 of X equals the received representative value indicating that the submitter did not change their value after submission of the representative value). Accordingly, submitters are prevented from predictively influencing the resultant certificate identifier (e.g., they cannot wait to see the values submitted by others and choose a value that will lead to a more predictable certified identifier).

The certificate issuer 250 then applies the certificate identifier to the certificate and publishes the signed certificate (block 390).

Figure 4:
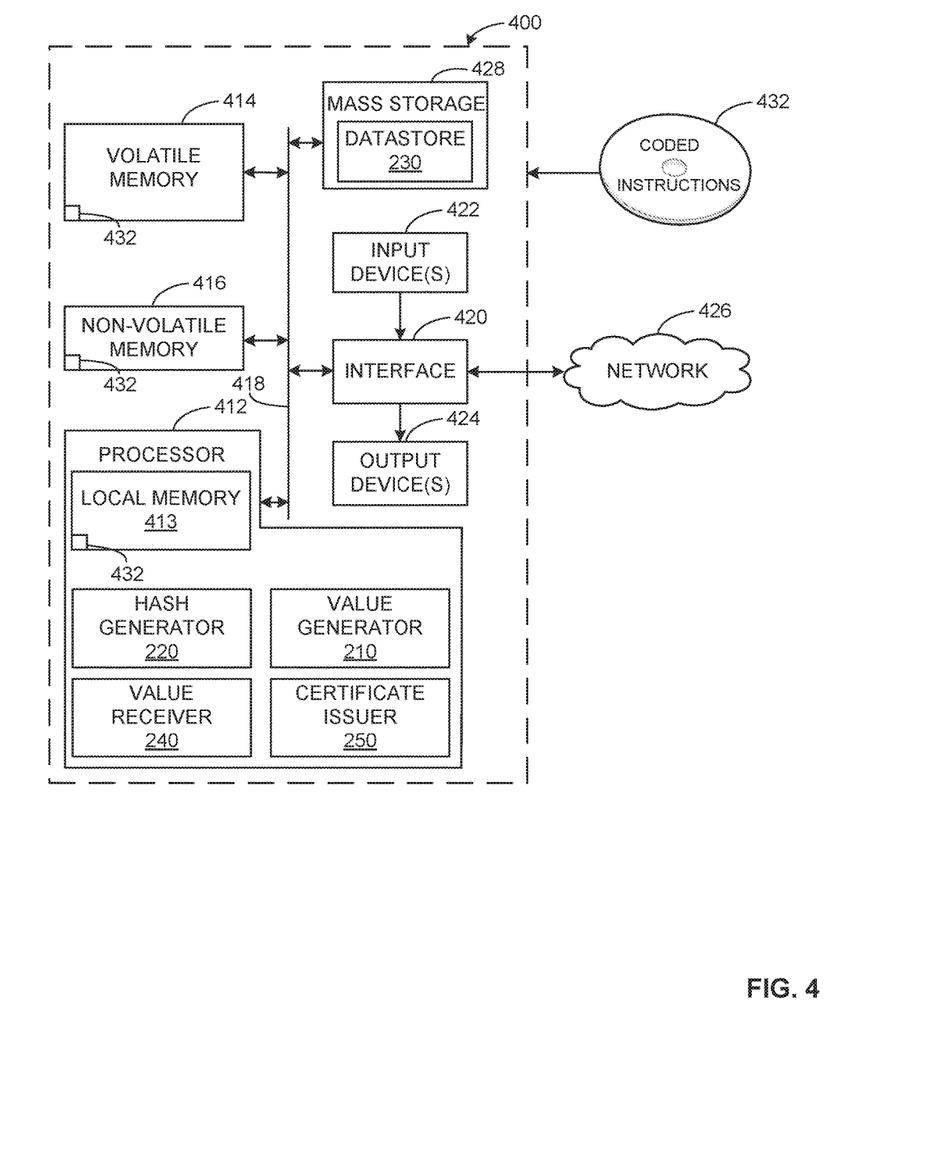
FIG. 4 is a block diagram of an example processor platform capable of executing the instructions of FIG. 3 to implement the certificate manager of FIGS. 1 and/or 2.

FIG. 4 is a block diagram of an example processor platform 400 capable of executing the instructions of FIG. 3 to implement the certificate manager 130 of FIG. 1 and/or FIG. 2. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 additionally includes the example hash generator 210, the example value generator 220, the example value receiver 240, and the example certificate issuer 250. The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives. The example mass storage stores the example datastore 230.

The coded instructions 432 of FIG. 3 may be stored in the mass storage device 428, in the volatile memory 414, in the non-volatile memory 416, and/or on a removable tangible computer readable storage medium such as a CD or DVD.

From the foregoing, it will be appreciated that the above disclosed methods, apparatus and articles of manufacture facilitate the issuance of digital certificates in a manner in which entities other than the certificate issuer may be assured that the certificate identifier (e.g., the serial number) is generated in a legitimate manner. In particular, because the certificate identifier is generated using contributions from multiple parties, entities can be assured that the certificate issuer has not been able to pre-select a certificate identifier that could be shared with another issued certificate. Furthermore, because representative values (e.g., hashes) of the contributions are shared while the contributions are initially kept secret, all entities can be assured that no other entity has selected a contribution that will generate a predicted outcome (e.g., selected a contribution that would cancel out another contribution when calculated with exclusive OR.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to issue a digital certificate, the apparatus comprising:
    a certificate issuer to generate, at a first entity, a digital certificate to be signed and a first hash value of a first contribution value to be used in generating a certificate identifier for the digital certificate and to communicate to a plurality of entities including a second entity and a third entity, from the first entity, the digital certificate with a request for identifiers and the first hash value; and
    a value receiver to receive, at the first entity, a second hash value uniquely identifying a second contribution value from a second entity, receive, at the first entity, a third hash value uniquely identifying a third contribution value from a third entity, and, after a period for accepting identifiers has ended, receiving, at the first entity, the second contribution value from the second entity and the third contribution value from the third entity;
    the certificate issuer to combine, at the first entity, the first contribution value, the second contribution value and the third contribution value to generate the certificate identifier for the digital certificate and to issue the digital certificate with the certificate identifier.

2. An apparatus as defined in claim 1, further including a value provider to generate the first contribution value using a random number generator.

3. An apparatus as defined in claim 1, wherein the certificate issuer is to generate the certificate identifier based on an exclusive-or operation including the second contribution value and the third contribution value.

4. An apparatus as defined in claim 1, wherein the certificate identifier is a certificate serial number.

5. An apparatus as defined in claim 1, wherein the certificate issuer waits the period for accepting identifiers following communication of the digital certificate before communicating the first contribution value.

6. An apparatus as defined in claim 5, wherein the certificate issuer is to publish the first hash value of the first contribution value prior to the end of the period for accepting identifiers.

7. An apparatus as defined in claim 1, wherein the value receiver is to confirm that the second hash value corresponds to the second contribution value.

8. A method to issue a digital certificate, the method comprising:
    generating, at a first entity, a digital certificate to be signed and a first hash value of a first contribution value to be used in generating a certificate identifier for the digital certificate;
    communicating to a plurality of entities including a second entity and a third entity, from a first entity, the digital certificate with a request for identifiers and the first hash value;
    receiving, at the first entity, a second hash value uniquely identifying a second contribution value from a second entity;
    receiving, at the first entity, a third hash value uniquely identifying a third contribution value from a third entity;

after a period for accepting identifiers has ended, receiving, at the first entity, the second contribution value from the second entity and the third contribution value from the third entity;

combining, at the first entity, the first contribution value, the second contribution value, and the third contribution value to generate the certificate identifier for the digital certificate; and issuing the digital certificate with the certificate identifier.

9. A tangible computer readable storage medium comprising instructions that, when executed, cause a machine to at least:

generate, at a first entity, a digital certificate to be signed and a first hash value of a first contribution value to be used in generating a certificate identifier for the digital certificate;

communicate to a plurality of entities including a second entity and a third entity, from a first entity, the digital certificate with a request for identifiers and the first hash value;

receive, at the first entity, a second hash value uniquely identifying a second contribution value from a second entity;

receive, at the first entity, a third hash value uniquely identifying a third contribution value from a third entity;

after a period for accepting identifiers has ended, receive, at the first entity, the second contribution value from the second entity and the third contribution value from the third entity;

combine, at the first entity, the first contribution value, the second contribution value, and the third contribution value to generate the certificate identifier for the digital certificate; and issue the digital certificate with the certificate identifier.

10. A tangible computer readable storage medium as defined in claim 9, wherein the instructions, when executed, cause the machine to generate the first contribution value using a random number generator.

11. A tangible computer readable storage medium as defined in claim 9, wherein the instructions, when executed, cause the machine to generate the certificate identifier based on an exclusive-or operation including the second contribution value and the third contribution value.

12. A tangible computer readable storage medium as defined in claim 9, wherein the certificate identifier is a certificate serial number.

13. A tangible computer readable storage medium as defined in claim 9, wherein the instructions, when executed, cause the machine to wait the period for accepting identifiers following communication of the digital certificate before communicating the first contribution value.

14. A tangible computer readable storage medium as defined in claim 13, wherein the instructions, when executed, cause the machine to publish the first hash value of the first contribution value prior to the end of the period for accepting identifiers.

15. A tangible computer readable storage medium as defined in claim 9, wherein the instructions, when executed, cause the machine to confirm that the second contribution value corresponds to the second hash value.

* * * * *